Aug. 29, 1950 A. L. WRONKE 2,520,592

TELEPHONE TEST SET WITH LINE RESISTOR

Filed Nov. 9, 1948

Inventor:
Anthony L. Wronke
By: A. Trevor Jones
Atty.

Patented Aug. 29, 1950 2,520,592

UNITED STATES PATENT OFFICE 2,520,592

TELEPHONE TEST SET WITH LINE RESISTOR

Anthony L. Wronke, Chicago, Ill.

Application November 9, 1948, Serial No. 59,145

2 Claims. (Cl. 179—175)

Figures 1, 2:
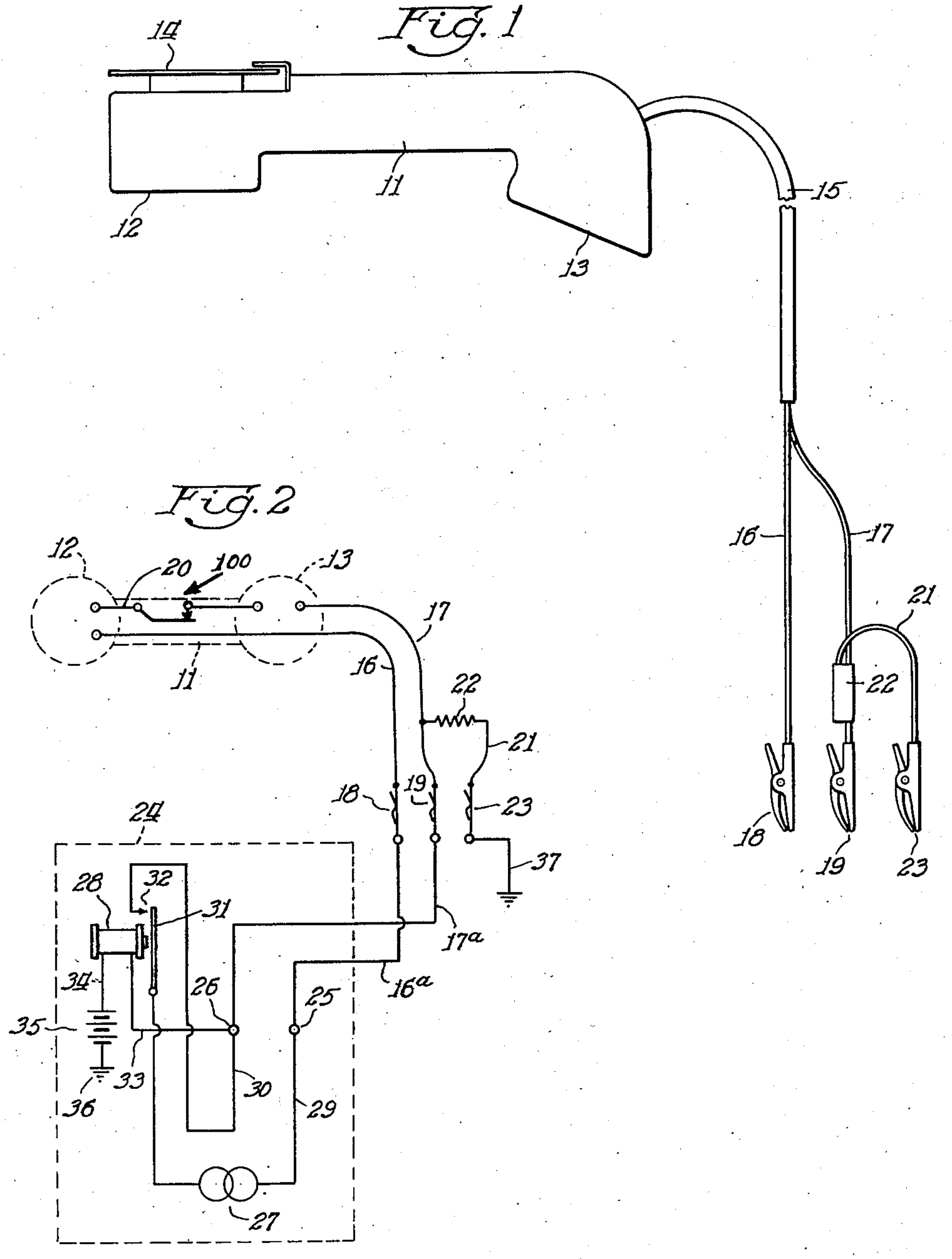

This invention relates to hand telephone test instrument or test set more particularly for use by telephone line men who are installing or repairing a telephone circuit and are required frequently to work on telephone wires strung on poles in alleys, streets and other outside places relatively far removed from both the particular installation involved and the central office.

Particularly in connection with so-called nickel first lines which include a dial for calling a number, no dial tone is heard indicating that the line is in order for a call until a five cent coin is deposited by the user whereupon a dial tone is heard and the user knows that the line is then in order for making a call by the use of the dial. For this reason, when a telephone repairman cuts into such a line, by connecting one lead of his test set with the ring or battery side of the line and the other lead of his test set with the tip of ground side of the line, he does not get a dial tone and therefore does not know whether the line is or is not in order, or whether it is the line which he intends to work on, and to ascertain this he must first call, from another line that is in working order, the central office tester by using the dial of his test instrument. This is time consuming and requires frequent trial and error.

The present invention aims to provide means on his test instrument for insuring that a dial tone would be heard if the line he cuts into is in order, by including in the test instrument a resistance in parallel with the ground lead of the instrument and a third clip for example for selectively grounding the resistance.

The invention will be readily understood and the accomplishment of the foregoing and other objects and advantages will be apparent from the following description, taken together with the accompanying drawings of an illustrative embodiment of the invention, and in which drawings:

Figure 1 is a view of a telephone test instrument embodying the present invention; and Figure 2 is a simple circuit diagram illustrative of the structure of Fig. 1 and of a useful application thereof for the present purposes.

Referring in detail to the illustration of the drawings, the numeral 11 may indicate a conventional hand telephone test set of the so-called French type having a receiver element 12 and a transmitter element 13, and commonly incorporating an impulse transmitting device such as the usual rotatable finger calling dial 14. A cable 15 extending from the hand set 11 may incorporate the usual test leads 16 and 17 terminating in spring clips 18 and 19 respectively by which the test instrument 11 may be cut into a telephone circuit, the lead 16 being what is known as the ring or battery side lead and the lead 17 being known as the tip or ground lead. As indicated in Fig. 2, the lead 16 goes to the receiver element and the lead 17 to the transmitter element. A contact including connection 20 within the instrument completes the series connection between the receiver and the transmitter. The wiring for the dial 14 may be conventional and as somewhat diagrammatically indicated at 100 in the connection 20.

In accordance with the present invention, I connect an auxiliary lead 21 through a resistance 22 with the tip or ground lead 17 and provide an auxiliary spring clip 23 for the auxiliary lead 21, thus providing the test instrument 11 with three leads instead of the conventional two leads.

When the test instrument of my present invention is used by the telephone line man, for example, he will first engage the spring clip 18 with the ring or battery wire of the circuit which he is attempting to test and the spring clip 19 with the tip or ground wire of the circuit. Then he may engage the auxiliary clip 23 with a grounded object or other so-called ground accessible at the location in which he is working such as a ground strip, ground cable, guy wire, water pipe, or the like.

The resistance 22 is substantial and is say between 900 and 1100 ohms. I have found resistance of the order of 1,000 ohms to be desirable and suitable for the purpose.

Fig. 2 indicates a simple illustrative circuit in that a central office is suggested by the rectangle 24 in which may be located the connection terminals 25 and 26, the dial tone generator 27 and a relay 28. The line which the line man may be testing is indicated by the wires 16*a* and 17*a*, representing the ring and tip sides of the line respectively and connected with the terminals 25 and 26 respectively through which a trunk connection may be made at the central office in the usual manner which need not here be described. It is sufficient for present purposes to indicate the wire 29 which connects the terminal 25 (through the dial tone generator 27) with the armature 31 of the relay 28, and the wire 30 which connects the terminal 26 with the contact 32 of the relay. The armature is as shown adapted to contact the contact 32 and close a circuit through the dial tone generator 27 to actuate the latter and set up a dial tone in the line 16a—17a, which, if present, will be heard in the receiver element 12 when the test instrument is hooked in as already described.

The winding of the relay 28 is connected as at 33 on one side with the terminal 26 and on the other side as at 34 with one side, in this instance the positive side, of a battery 35, the other side of the battery being grounded as at 36. With a test instrument not equipped with my auxiliary device 21—22—23 the dial tone will not be heard in the test instrument 11 even though the line is in order, because of the fact that the relay 28 will not be energized to close the contact 32 with the armature merely by connecting the lead 16 with the wire 16a and the lead 17 with the wire 17a, but, when the device 21—22—23 of my invention is employed, and the lead 21 is connected with a ground such as at 37, through the resistance 22, the relay 28 will be energized to close contact 32 and a circuit made which will actuate the dial tone generator 27. A dial tone will then be heard in the test instrument, and the line man will not need to call the central office tester but may call the operator at the central office direct by the use of the dial 14 to ascertain whether the line 16a—17a is the line upon which he is working, thus saving time.

It will be understood that the foregoing discussion may relate primarily to a telephone line going to a coin box and in which the dial tone is not heard until after the user has dropped a five cent coin into the box. My attachment 21—22—23 thus functions in effect for the line man as the equivalent of the dropping of the coin into the box, which box would not be ordinarily accessible to the line man working out-of-doors, say, on the line, and particularly when he is working on a pole or on a terminal box located on the rear outside wall of a building.

In some telephone systems although the installer or repair man can get dial tone by going in on the line, he cannot get the operator, to identify the line for him, because the central office equipment is so set up that the operator cannot be reached by merely cutting in with a conventional test instrument, and this may be true of so-called measured service two-party lines which do not use the coin box. By the use of my present device 21—22—23 the operator can be reached since a resistance of about 1000 ohms is placed across the tip side and ground.

Another use for the invention is to enable the line man to call a subscriber from the pole or terminal box without the use of a nickel or without the subscriber being charged for such call.

The term "clip" is intended to include any suitable contact making instrumentality.

It will be understood that my invention is not limited to details of construction shown for purposes of exemplification. For example, resistance 22 could be built into the test set 11 for convenience or compactness, and other changes might be made without departing from the invention and while still falling within the scope of the appended claims.

Having described my invention, what I here claim is:

1. In a telephone hand test instrument embodying a receiver, a transmitter, said receiver and transmitter each having a first side and a second side, connections within each of said receiver and transmitter between the first and second sides thereof, a connection from a first side of the receiver to a first side of the transmitter, an impulse transmitting device having contact means in series with said connections, the combination of, a lead to said second side of the receiver, another lead to said second side of the transmitter, said leads also being in series with said contact means, one of said leads serving as a ring side lead and the other as a tip side lead, clips on said leads respectively, a third clip for connecting to ground, a lead from said third clip connected to the tip side lead, and a resistance in said third clip lead.

2. The structure of claim 1 wherein the resistance is of the order of 1,000 ohms.

ANTHONY L. WRONKE.

REFERENCES CITED

The following references are of record in the file of this patent:

UNITED STATES PATENTS

| Number | Name | Date |
|---|---|---|
| 689,937 | Werner | Dec. 31, 1901 |
| 1,215,331 | Bascom | Feb. 13, 1917 |
| 1,439,729 | Deakin | Dec. 26, 1922 |
| 1,442,648 | Carter | Jan. 16, 1923 |
| 1,613,851 | Sengebusch | Jan. 11, 1927 |
| 1,868,960 | Anderson | July 26, 1932 |
| 1,909,248 | Benkelman | May 16, 1933 |
| 1,978,053 | Mason | Oct. 23, 1934 |
| 2,043,201 | Long | June 2, 1936 |